(12) United States Patent
Chmaytelli et al.

(10) Patent No.: US 8,014,762 B2
(45) Date of Patent: Sep. 6, 2011

(54) TIME AND LOCATION-BASED NON-INTRUSIVE ADVERTISEMENTS AND INFORMATIONAL MESSAGES

(75) Inventors: Mazen Chmaytelli, San Diego, CA (US); David Lee Larom, San Diego, CA (US); Christophe Bernard, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1486 days.

(21) Appl. No.: 11/096,746

(22) Filed: Mar. 31, 2005

(65) Prior Publication Data

US 2006/0253453 A1    Nov. 9, 2006

(51) Int. Cl.
*H04M 3/42*    (2006.01)
(52) U.S. Cl. ............ 455/414.1; 455/414.2; 455/414.3; 455/414.4; 455/456.1; 455/456.3; 455/456.6; 455/466; 455/558; 455/566; 705/14; 705/26
(58) Field of Classification Search .......... 455/457, 455/414.1, 414.2, 414.3, 414.4, 456.1–456.6, 455/466, 566, 558; 705/14, 37, 10, 26
See application file for complete search history.

(56) References Cited

U.S. PATENT DOCUMENTS

| | | | |
|---|---|---|---|
| 5,418,528 A | | 5/1995 | Hosack et al. |
| 6,114,969 A * | | 9/2000 | Hymel .......................... 340/7.48 |
| 6,496,857 B1 * | | 12/2002 | Dustin et al. .................. 709/219 |
| 6,574,453 B1 | | 6/2003 | Honda et al. |
| 6,738,630 B2 * | | 5/2004 | Ashmore .................... 455/456.3 |
| 7,020,685 B1 * | | 3/2006 | Chen et al. ..................... 709/204 |
| 7,024,208 B2 * | | 4/2006 | Kaise .......................... 455/456.3 |
| 7,043,262 B2 | | 5/2006 | Nageli |
| 7,076,244 B2 | | 7/2006 | Lazaridis et al. |
| 7,127,229 B2 | | 10/2006 | Baba et al. |
| 7,228,121 B2 | | 6/2007 | Kennedy |
| 7,248,861 B2 * | | 7/2007 | Lazaridis et al. .......... 455/414.1 |
| 7,251,494 B2 | | 7/2007 | Bates et al. |
| 7,359,712 B2 | | 4/2008 | Gutowski et al. |
| 7,392,057 B2 | | 6/2008 | Lee |
| 7,487,112 B2 * | | 2/2009 | Barnes, Jr. ...................... 705/26 |
| 2001/0047272 A1 * | | 11/2001 | Frietas et al. ..................... 705/1 |
| 2002/0068554 A1 * | | 6/2002 | Dusse ............................ 455/419 |
| 2002/0183075 A1 | | 12/2002 | Fauconnier |
| 2003/0143974 A1 | | 7/2003 | Navarro |
| 2004/0044572 A1 * | | 3/2004 | Kawamata et al. ............. 705/14 |

(Continued)

FOREIGN PATENT DOCUMENTS

GB    2397930    8/2004

(Continued)

OTHER PUBLICATIONS

International Search Report, PCT/US06/012036, International Search Authority, United States, Jun. 13, 2008.

(Continued)

*Primary Examiner* — Olumide T Ajibade-Akonai
(74) *Attorney, Agent, or Firm* — John L. Ciccozzi; Fariba Yadegar-Bandari

(57) ABSTRACT

Systems and methods for sending and receiving ads from a server to a client device are disclosed. The ads can be sent based on the location of the client device and/or a designated time window. An ad manager on the client device can display, store and manage the received ads and activated additional applications based on the content of the ad.

66 Claims, 12 Drawing Sheets

U.S. PATENT DOCUMENTS

| | | | |
|---|---|---|---|
| 2004/0214611 A1 | 10/2004 | Jong et al. | |
| 2004/0260604 A1* | 12/2004 | Bedingfield, Sr. | 705/14 |
| 2005/0037728 A1 | 2/2005 | Binzel et al. | |
| 2005/0176441 A1 | 8/2005 | Jurecka | |
| 2005/0192861 A1* | 9/2005 | Nakazawa et al. | 705/14 |
| 2006/0053050 A1* | 3/2006 | Schweier | 705/14 |
| 2006/0058004 A1 | 3/2006 | Dolezal et al. | |
| 2006/0217110 A1* | 9/2006 | Othmer | 455/414.1 |
| 2006/0223494 A1 | 10/2006 | Chmaytelli et al. | |
| 2007/0216572 A1 | 9/2007 | Schnabel | |
| 2007/0232306 A1 | 10/2007 | Johannesson et al. | |

FOREIGN PATENT DOCUMENTS

| | | |
|---|---|---|
| JP | 2002259274 | 9/2002 |
| JP | 2003050767 | 2/2003 |
| JP | 2003058770 | 2/2003 |
| JP | 2003288289 | 10/2003 |
| JP | 2004132717 | 4/2004 |
| JP | 2004342031 | 12/2004 |
| JP | 2005-044194 | 2/2005 |
| KR | 2003-0046656 | 6/2003 |
| KR | 2004-0063425 | 7/2004 |
| KR | 2002-0046443 | 6/2006 |
| WO | WO0030379 | 5/2000 |

OTHER PUBLICATIONS

Written Opinion, PCT/US06/012036, International Search Authority, United States, Jun. 13, 2008.

International Preliminary Report on Patentability, PCT/US06/012036, The International Bureau of WIPO, Geneva, Switzerland, Mar. 10, 2009.

* cited by examiner

TIME AND LOCATION-BASED NON-INTRUSIVE ADVERTISEMENTS AND INFORMATIONAL MESSAGES

BACKGROUND OF THE INVENTION

1. Field

The present invention generally relates to communications between remote computing devices and servers. More particularly, the invention relates to the creation, sending and viewing of messages across a network to a remote client device based on the location of the client device.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, these smaller and more powerful personal computing devices are typically severely resource constrained. For example, the screen size, amount of available memory and file system space, amount of input and output capabilities and processing capability may each be limited by the small size of the device, and in particular, the small size of the user input unit, e.g., the keyboard. Because of such severe resource constraints, it is often typically desirable, for example, to maintain a limited size and quantity of software applications and other information residing on such remote personal computing devices (client devices).

Some of the personal computing devices utilize application programming interfaces (APIs), sometimes referred to as runtime environments and software platforms, that are installed onto their local computer platform and which are used, for example, to simplify operations of such devices, such as by providing generalized calls for device specific resources. Further, some such APIs are also known to provide software developers the ability to create software applications that are fully executable on such devices. In addition, some of such APIs are known to be operationally located between the computing device system software and the software applications such that the computing device computing functionality is made available to the software applications without requiring the software developer to have the specific computing device system source code. Further, some APIs are known to provide mechanisms for secure communications between such personal devices (i.e., clients) and remote devices (i.e., servers) using secure cryptographic information.

Examples of such APIs, some of which are discussed in more detail below, include versions of the Binary Runtime Environment for Wireless® (BREW®) developed by QUALCOMM, Inc., of San Diego, Calif. BREW® can cooperate with a computing device's (e.g., a wireless cellular phone) operating system, and can, among other features, provide interfaces to hardware features particularly found on personal computing devices. BREW® can also provide these interfaces on such personal computing devices at a relatively low cost with respect to demands on device resources and with respect to the price paid by consumers for devices containing the BREW® API. Additional features of BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

In current wireless server-client systems, information can be transmitted to the wireless devices, such as a cellular telephone, by short messaging service ("SMS"), or other over-the-air methods known in the art. SMS messages typically result only in a disruptive notification (e.g., popup window) to the user before the message goes to a generic inbox, or else the message may be temporarily displayed before being deleted. Conventional SMS messages do not take advantage of the advances in the enhanced computing and display capabilities of the wireless clients.

The foregoing description of the related art is merely intended to provide an overview of some of the known uses of APIs and as an introduction to the BREW® platform, which can be used in embodiments of the invention. However, the invention is not to be construed as being limited to a specific implementation, operating platform or environment.

SUMMARY OF THE EXEMPLARY EMBODIMENTS

Exemplary embodiments of the present invention are directed to a system and method for sending and receiving advertisements (ads) on a portable communication device.

At least one embodiment of the invention includes a wireless advertisement (ad) delivery system, comprising: a server configured to generate and transmit an ad containing location data that defines a geographic area; and a client device including a carrier announcement manager (CAM), wherein the CAM is configured to receive the ad, and wherein the ad is directed to the client device based on a location of the client device and the geographic area defined in the ad.

Another embodiment of the invention includes a method for wirelessly communicating advertisements comprising: generating an ad containing location data; identifying a client device to receive the ad based on the location data in the ad and a location of the client device; and transmitting the ad to the client device.

Another embodiment of the invention includes a wireless client device, comprising: a user interface; and a carrier announcement manager (CAM) configured to receive an ad containing location data that defines a targeted area, and configured to store the ad on the client device, if the client device is within the targeted area.

Another embodiment of the invention includes a method for wirelessly receiving an advertisement at a client device comprising: receiving an ad containing location data; determining a geographic location of the client device; and determining if the client device is within a geographic area defined by the location data contained in the ad based on the geographic location of the client device.

Another embodiment of the invention includes a computer-readable medium on which is stored a computer program for wirelessly communicating location-based ads, the computer program comprising instructions which, when executed by at least one computing device, causes the computing device to perform the process of: generating an ad containing location data; identifying a client device to receive the ad based on the location data in the ad and a geographic location of the client device; and transmitting the ad to the client device.

Another embodiment of the invention includes a computer-readable medium on which is stored a computer program for wirelessly communicating location-based ads, the computer program comprising instructions which, when executed by at least one computing device, causes the computing device to perform the process of: receiving an ad containing location data at a client device; determining a geographic location of the client device; and determining if the client device is within a geographic area defined by the location data contained in the ad based on the geographic location of the client device.

Another embodiment of the invention includes a server for wirelessly communicating ads comprising: means for generating an ad containing location data that defines a geographic area; means for identifying a client device to receive the ad based on the geographic area and a geographic location of the client device; and means for transmitting the ad to the client device.

Another embodiment of the invention includes a client device for wirelessly receiving ads comprising: means for receiving an ad containing location data that defines a geographic area; and means for storing the ad on the client device, if a geographic position of the client device is within the geographic area.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION OF THE PREFERRED EMBODIMENTS

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One or more embodiments of the invention can be used in conjunction with a runtime environment (e.g., API) executing on the computing device. One such runtime environment (API) is Binary Runtime Environment for Wireless® (BREW®) software previously discussed. However, one or more embodiments of the invention can be used with other types of runtime environments (APIs) that, for example, operate to control the execution of applications on wireless client computing devices. Additionally, "API" is intended to be construed broadly as a stand alone program or portion of a program that is used to achieve a particular function and can be used interchangeably with the terms "application", "program", "routine", "instructions" and "applet".

Figure 1:
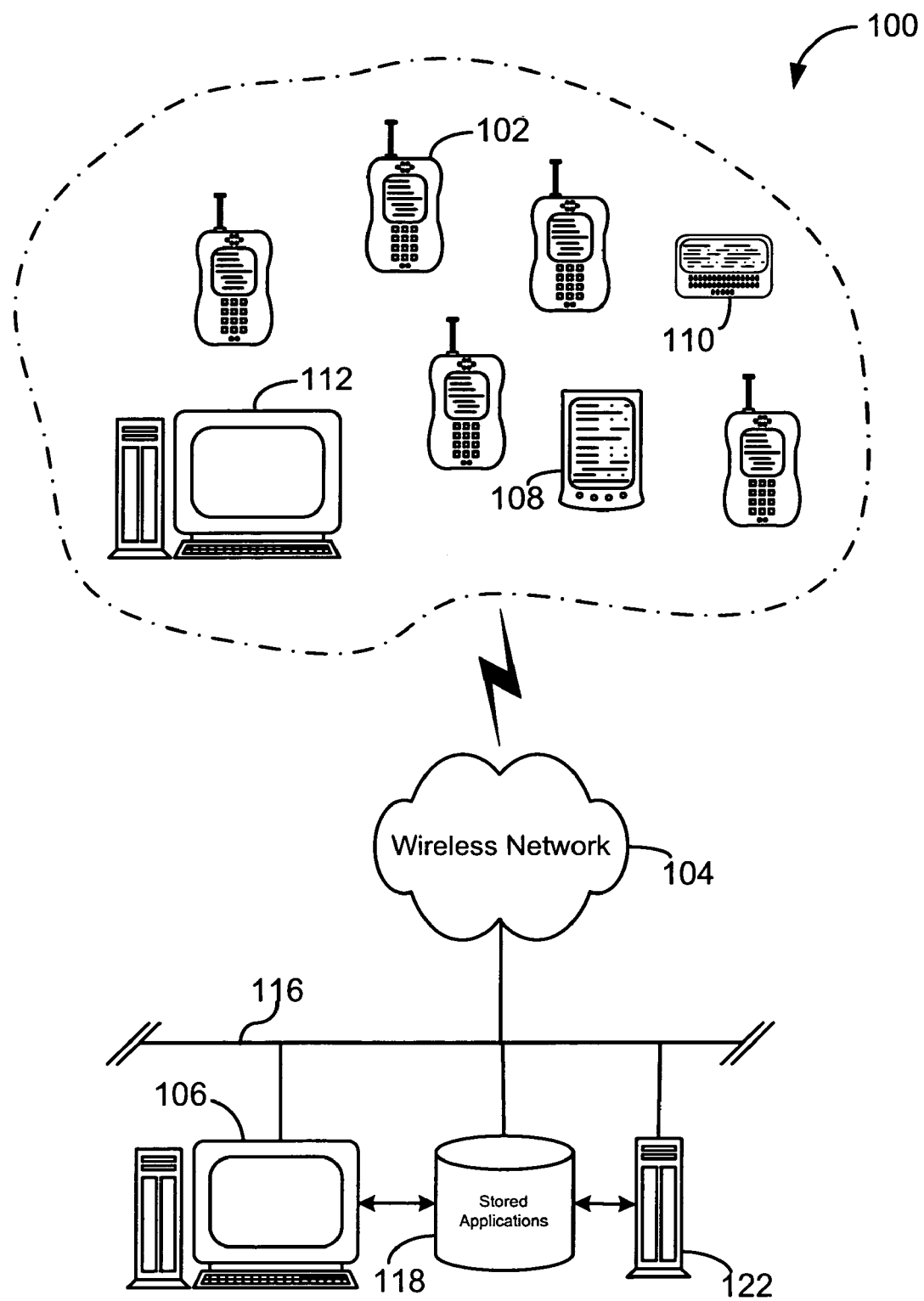
FIG. 1 is a diagram of a wireless network architecture that supports the client devices and servers in accordance with at least one embodiment of the invention.

FIG. 1 illustrates a block diagram of one exemplary embodiment of a wireless system 100 in accordance with at least one embodiment of the invention. System 100 can contain client devices, such as cellular telephone 102, in communication across a wireless network 104 with at least one application download server 106 that selectively transmits software applications and components to wireless devices across a wireless communication portal or other data access to the wireless network 104. As shown here, the wireless (client) device can be a cellular telephone 102, a personal digital assistant 108, a pager 110, which is shown here as a two-way text pager, or even a separate computer platform 112 that has a wireless communication portal. The embodiments of the invention can thus be realized on any form of client device including a wireless communication portal or having wireless communication capabilities, including without limitation, wireless modems, PCMCIA cards, personal computers, access terminals, telephones, or any combination or sub-combination thereof.

The application download server 106 is shown here on a network 116 with other computer elements in communication with the wireless network 104. There can be a stand-alone server 122, and each server can provide separate services and processes to the client devices 102, 108, 110, 112 across the wireless network 104. There is preferably also at least one stored application database 118 that holds the software applications that are downloadable by the wireless devices 102, 108, 110, 112. However, those skilled in the art will appreciate that the configuration illustrated in FIG. 1 is merely exemplary. Accordingly, embodiments of the invention can include one or more servers that can each perform all the described functions and contain all necessary hardware and software, or can contain only selected functionality.

Figure 2:
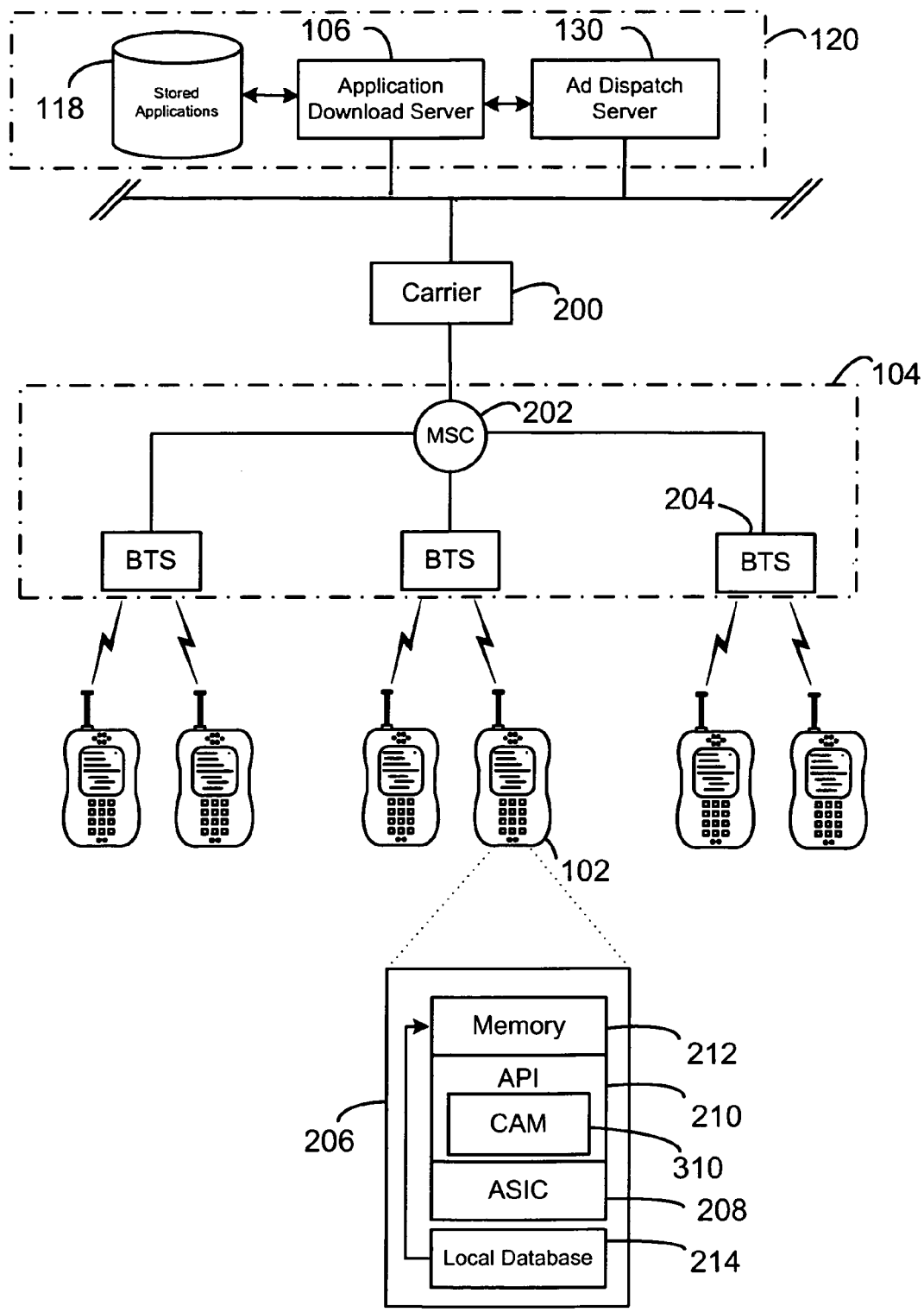
FIG. 2 is a more detailed diagram of a wireless network architecture that supports the client devices and servers in accordance with at least one embodiment of the invention.

In FIG. 2, a block diagram is shown that more fully illustrates system 100, including the components of the wireless network 104 and interrelation of the elements of the exemplary embodiments of the invention. System 100 is merely exemplary and can include any system that allows remote client devices, such as wireless client computing devices 102, 108, 110, 112 to communicate over-the-air between and among each other and/or between and among components connected via a wireless network 104, including, without limitation, wireless network carriers and/or servers. The application download server 106 and the stored application database 118, along with any other servers such as ad dispatch server 130 which are used to provide cellular telecommunication services, communicate with a carrier network 200, through a data link, such as the Internet, a secure LAN, WAN, or other network. In the embodiment shown, a server 120 can include the application download server 106, ad dispatch server 130 and the stored application database 118. However, these servers can also be independent devices. The ad dispatch server 130 can provide additional ad services based on the configuration of each of the client devices 102, 108, 110, 112.

The carrier network 200 controls messages (typically sent as data packets) sent to a messaging service controller ("MSC") 202. The carrier network 200 communicates with the MSC 202 by a network, the Internet and/or a public switched telephone network (PSTN). Typically, the network or Internet connection between the carrier network 200 and the MSC 202 transfers data, and the PSTN transfers voice information. The MSC 202 can be connected to multiple base stations ("BTS") 204. In a similar manner to the carrier network, the MSC 202 is typically connected to the BTS 204 by a network, the Internet and/or PSTN for data transfer and/or voice information. The BTS 204 can broadcast data messages wirelessly to the client devices, such as cellular telephone 102, by short messaging service ("SMS"), UDP datagrams, or other over-the-air (OTA) methods known in the art. The terms "API-direct", "directed SMS" and "BREW-directed SMS" are used interchangeably in the following description to indicate an OTA message that includes coding to launch an application resident on the client device. Likewise, the terms "advertisement", "ad", "announcement", and "message" are used interchangeably to indicate the information and/or instructions sent to a client device.

The client device, (here a wireless client computing device), such as cellular telephone 102, has a computer platform 206 that can receive and execute software applications and/or commands transmitted from the application download server 106, ad dispatch server 130 and/or server 120. The computer platform 206 can include an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The API 210 also includes a Carrier Announcement Manager module (CAM) 310 containing logic configured to process special OTA (e.g., SMS) ads transmitted from the carrier network 200. The computer platform 206 also includes a local database 214 that can hold applications not actively used in memory 212. The local database 214 is typically a flash memory cell, but can be any secondary storage device as known in the art, such as magnetic media, EPROM, optical media, tape, soft or hard disk, or the like.

The wireless client computing device, such as cellular telephone 102, has installed on it, or otherwise downloads, one or more software applications, such as games, news, stock monitors, and the like. For example, the cellular telephone 102 may receive one or more software applications downloaded from the application download server 106. The software applications may be stored on the local database 214 when not in use. The cellular telephone 102 or other wireless computing device may upload resident applications stored on the local database 214 to memory 212 for execution on the API 210 when so desired by the user or invoked by another API.

As used herein "client device", "wireless device" or "client computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to ads communicated between a client device and a server. The client computing device can be serviced by at least one remote server with respect to at least such ads. Some examples of "wireless computing devices" which may be used in accordance with embodiments of the present invention include cellular telephones or other wireless communication units, PDAs, paging devices, navigation devices (e.g., GPS-based systems), handheld gaming devices, music or video content download units, and other like wireless communication devices.

The wireless communication between the client device 102 and the BTS 204 can be based on different technologies, such as code division multiplexed access (CDMA), time division multiplexed access (TDMA), frequency division multiplexed access (FDMA), the global system for mobile communications (GSM), or other protocols that may be used in a wireless communications network or a data communications network. The data communication is typically between the client device 102, BTS 204, and MSC 202. The MSC 202 can be connected to multiple data networks such as the carrier network 200, PSTN, the Internet, a virtual private network, and the like, thus allowing the client device access to a broader communication network. As discussed in the foregoing, in addition to voice transmission, data can be transmitted to the client device via SMS or other OTA methods known in the art.

However, in addition to delivering basic messages, embodiments of the invention can utilize APIs to access the enhanced functionality of the client devices. Further, these API-directed SMS messages that allow access to underlying APIs can be separated from the conventional SMS messages and stored in a separate inbox to allow for the easy organization, storage, and retrieval of the relevant enhanced SMS messages. Accordingly, one aspect of embodiments of the invention includes a specialized API for managing these enhanced SMS messages, hereinafter referred to as a Carrier Announcement Manager (CAM).

Figure 3:
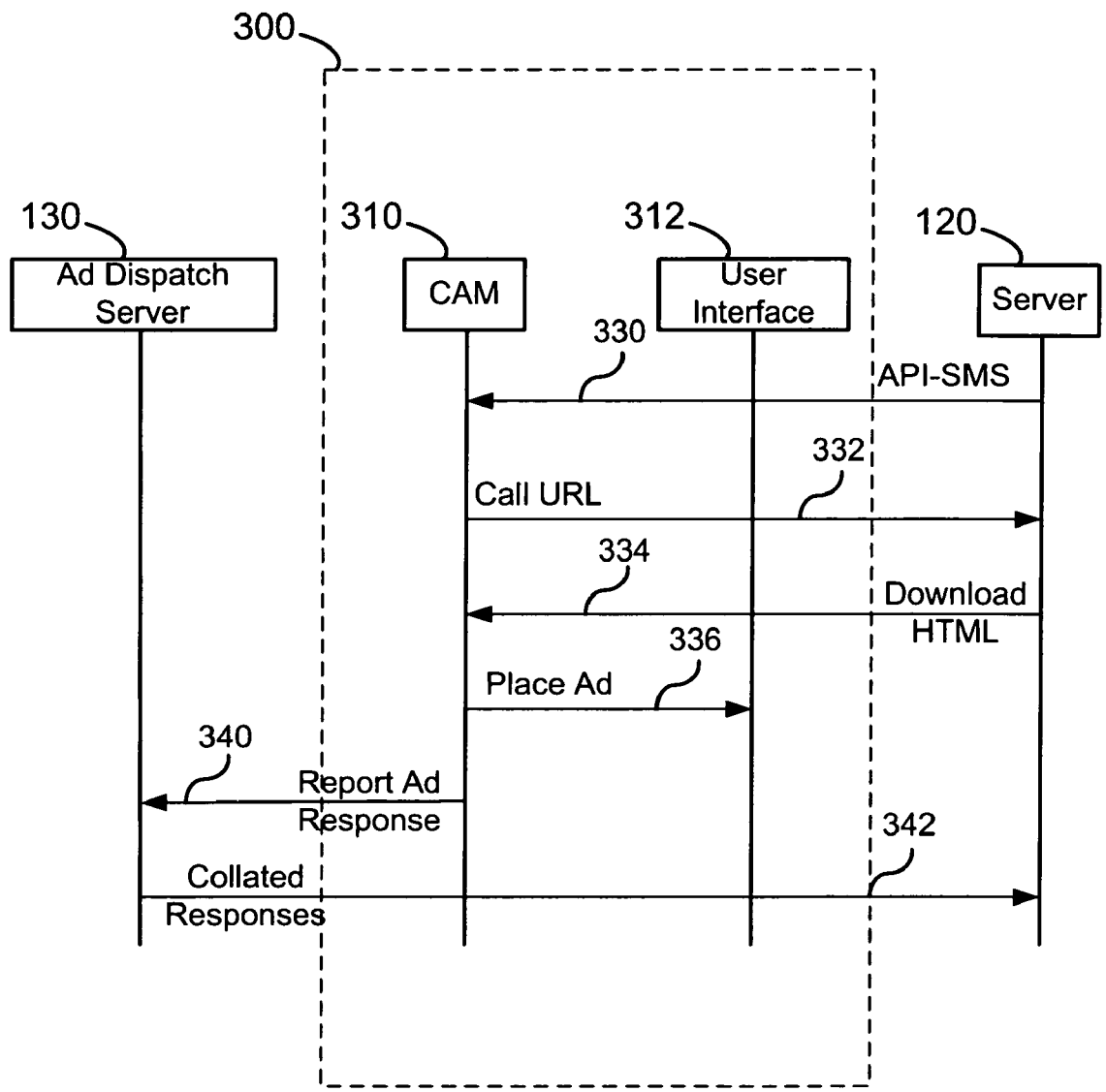
FIG. 3 is a diagram representing the architecture of the CAM system in accordance with at least one embodiment of the invention.

In FIG. 3, an example of the system interaction with the Carrier Announcement Manager (CAM) architecture is illustrated. CAM 310 can be installed into a client device 300, also including a user interface 312 (e.g., display, keypad). In at least one embodiment of the invention, server 120 (e.g., residing on a carrier network) can act as the Short Message Service Center (SMSC) server (or other OTA system) and ad server. However, the SMSC server and ad server can also reside on independent devices and/or networks. Server 120 can send enhanced ad messages to the CAM 310 using a variety of techniques. For example, server 120 can send an API-directed SMS message 330 that contains data to be inserted into a predefined HTML template that is already resident on the client device 300. The ad can then appear on the user interface (e.g., the main screen of the client device 300) without any action from the end-user. Accordingly, the client device 300 can display 336 an attractive and interactive ad, using only the limited data sent in the SMS message. The SMS message can be text, a URL or both. For example, the SMS message 330 can contain text and an associated URL that allows a user of the client device 300 to connect to a specific site for additional information and/or to purchase the article advertised. For example, a one step feedback mechanism (e.g., touchscreen, pen input, softkey, hardkey, or other programmed selection) for response to the ad (e.g., "Buy Now") can be provided that allows the user to connect to the specific site associated with the ad to purchase the article.

In another example, the server 120 (e.g., using the ad dispatch server and SMSC server) can send an API-directed SMS message 330 containing a URL and/or code to perform a call back to server 120 or other remote server. For example, CAM 310 can receive the message 330 and call an appropriate API (e.g., a browser) to initiate the connection 332 to the server 120 and download an associated HTML page/document (e.g., advertisement) 334 to client device 300. After the HTML page has been downloaded, the page can be displayed 336 on the client device 300. In this embodiment, the HTML callback allows server-stored graphic advertising (e.g., on the ad dispatch server) to be placed on the main screen of the client device 300 instead of a simple SMS text-only advertisement. Those skilled in the art will appreciate that embodiments of the invention are not limited to HTML documents and that a document retrieved may include any format to convey the desired advertisement, such as XML, HDML, WML, XHTML and/or graphic formats such as PNG, GIF, JPEG, BMP, and the like. This aspect of the API-directed SMS for CAM advertisement placement can be referred to as an Announcement Download Request (ADR). Unlike the pure SMS methods, the ADR does not contain the ad itself. Instead its payload is a URL pointing to an ad located on the server 120 (e.g., contained in the ad dispatch server). CAM 310 downloads the ad from the URL given by the ADR and can present it according to a predefined rule set. Separate HTML ads can be cached on the server 120 for each client device type (e.g., specific handsets, PDAs and the like), or the server 120 can have an application that builds HTML ads on the fly, tailoring the ad to the capabilities of the client device 300. In addition to the SMS and HTML ads, ads can be of any type of text-based message and/or graphic-based message (e.g., pdf, XML, JPEG, MPEG and the like).

Optionally, the CAM 310 can report 340 the response to the ad (e.g., the advertisement was discarded, a purchase was made, and the like) to a server (e.g., ad dispatch server 130). This ad response data can be accumulated and sent on a periodic basis or can be sent on each event. The ad dispatch server 130 can then collate the reported responses (e.g., from one or more client devices) and send the collated responses 342 (e.g., using an XML feed) back to server 120. The server 120 can interpret the received data and utilize the data to design new advertisements based on the data received from ad dispatch server 130. Those skilled in the art will appreciate that ad dispatch server 130 can be integrated into server 120, or can be a plurality of separate servers that perform functionally as described. In addition to using the feedback for advertisement improvement, the data supplied by CAM 310 can be used for billing the advertisers (e.g., based on number of times an ad is viewed, clicked on, and the like). Further, ad viewing data can be tracked and reported in the ad response data, such as, information regarding whether all pages of an ad were viewed, whether some links were followed, and the like.

To allow for greater flexibility, carriers can choose between direct SMS ads, which minimize download times, network load and storage space, or HTML callback ads, which are of higher quality with richer environments, but can have greater download times and increase network load. Additionally, the costs of ads can be tiered based on ad type. In these situations, the HTML ads featuring richer environments typically would cost more than SMS text-only ads.

Although graphic ads can be desirous for their visual and marketing impact, the ads can also be distracting to the user. Accordingly, an unobtrusive method of delivering ads can aid in the ultimate marketing of the product or application. To facilitate this marketing, a "sticky" ad (i.e., an ad that is not easily deleted) can be placed in a special location so that it is easily retrievable at a later time by the user or automatically retrieved based on predefined criteria. Accordingly, a further embodiment of the invention can include a CAM inbox for storage of the ads. For example, the CAM inbox can present the user with two softkey options when an ad is presented: buy the subject of the ad now ("Buy Now") or don't buy the subject of the ad now ("Not Now"). Choosing the "Buy Now" option can direct the user to a purchase page for the advertised application or product. "Not Now" closes the ad and pushes it to the CAM inbox, which can be an ad cache that is part of the CAM application data space and can be separate from the standard SMS inbox. Ads can be stored in the CAM inbox based on available data space, for example, thirty SMS/text-based ads. In one example of this embodiment, the ads are listed from newest to oldest. Additionally, when caching the next ad would exceed available storage, the oldest ad is deleted to make room for the newest. Further, stored ads can be manually retrieved and opened from the CAM inbox.

The CAM inbox can present the ads as a series of scrolling one-line headlines. The ad itself can define an intelligible headline. For example, the default headline can be the initial characters of the SMS payload. The end-user can use the up/down arrow keys on typical client devices or other navigational keys to go between ads. Two softkeys can be presented for a selected ad headline, such as "Check it out" and "Delete." The headline can also be presented on the external screen of "clamshell"-style phones. Deletion or caching of the full-page ad will result in deletion of the external screen ad as well.

To enhance the possibility that the ad will be viewed and acted upon, in one embodiment the ad cannot be deleted at the initial presentation/notification and can only be sent to the CAM inbox. The ad can be deleted from the CAM inbox screen or in the normal maintenance of the CAM inbox. When an ad has been cached, it typically will not be re-presented unless the user starts CAM manually and views it.

If a new ad is sent to the client device before an ad is viewed or cached, the new ad can be presented and the old ad can be buffered in the CAM Inbox. Buffered ads, including ads not yet presented can presented in last-in, first out (LIFO) order. Further, when the end-user hits "Not Now" or similar function, a minimum amount of time, such as five minutes, can be established as delay before the next ad is presented. Carrier usage guidelines may dictate longer or shorter durations between ad presentations.

Additionally, the user has the option to access the CAM manually in order to view or delete any cached ads. Starting the CAM manually presents the ad stack as a scrollable set of one-line ad headers, in one embodiment. Clicking on the ad header can open and display the full ad. Additionally, in another embodiment, the CAM can compile and store operations of the end-user, such as, the manual opening of the CAM, viewing of ads, and deleting of ads. This data can then be used to monitor user behavior and to refine the targeted marketing. Further, this system allows for the evaluation of the CAM system's effectiveness. Also, CAM can report this data to a remote server (e.g., an ad dispatch server) in a CAM usage report, as discussed in the foregoing description of FIG. 3. The server can collate and parse these reports. Relevant ad viewing and application or content purchase information can be collated and can be included in a report to additional servers and/or the ad senders.

In a further embodiment of the present invention, carriers can offer both opt-in and opt-out options to end-users. Opt-in indicates that at some point the end-user has agreed to install and/or use the CAM system. For example, when the CAM is started for the first time on the client device, it can query the end-user, e.g., "Do you wish to receive carefully screened advertisements on this phone?" Opt-out indicates that the end-user has the ability to refuse to receive ads. A reasonably accessible opt-out procedure can save expensive customer service calls from end-users who do not wish to receive ads.

Purchase data related to ads (e.g., application/content purchases) can provide some of the most valuable data to measure and leverage additional Average Revenue Per User (ARPU) generated by CAM ads. This information can be tracked and used to provide carriers and/or vendors with data regarding the profitability of the CAM system. Additionally methods of tracking CAM effectiveness can also be used. For example, the time of the ad placement can be noted and correlated with spikes in purchases of the advertised content at that time. A CAM usage report can also note what type of ad was used. For example, if a SMS or HTML ad was received by the end-user, that data can be reported in the report.

In another aspect of the present invention, HTML ads can also be cached on the client device for future viewing. Because each HTML ad can include up to 2 k-3 k of data or more, additional restrictions on the storage of HTML ads can be used. For example, only the most recent ads or ads that have been deliberately viewed by the user are stored. When the newest ad is pushed onto the ad stack, the oldest HTML ad can be deleted and replaced with an ADR directing the CAM system to a location containing the HTML ad (e.g., ad distribution server). Cached ads can thus be displayed more quickly and at the will of the user. Additionally, older HTML ads (e.g., ADRs) can still be viewed. When clicking on the titles of the older ads, an HTML callback can be initiated for the selected ad. Thus the system provides great flexibility in viewing previous ads.

In another embodiment of the invention, a SMS ad, ADR ad or HTML ads can be downloaded in the background and not directly activate any ringers, buzzers or other notifications. After the ad has been downloaded, an initial ad presentation can be passive with no user notification, thus eliminating untimely or undesired noises, vibrations and the like. After the ad is received, there are a variety of options for initial presentation of the ad. For example, a first option can use a small and optionally blinking icon on the main screen to notify the end-user to open the CAM inbox.

Another option can include a one line caption that can be delivered to the main screen. For example, the caption can be the same as the ad headline in the CAM inbox. A softkey press can then open the ad. This option would not take up much physical space on the screen, but it would grab the attention of the end-user. Additionally, full viewing of the ad would be only one softkey press away.

Another option is to have the ad presented on the full screen. This option presents the most immediate opportunity for end-user viewing. In this scenario, a single button push could change the screen from the ad back to the normal background. However, in a further option, the ad may be incorporated as "smart wallpaper" and viewed as ad wallpaper on the background of the screen. The ad wallpaper can overwrite all or a portion of the current wallpaper on the main screen for a fixed period of time or until an action from the user saves or discards the ad.

Another option can include presenting the ad after a predefined event has occurred, for example, the ad can be presented after the END key is depressed, which indicates a task has been completed. In this embodiment the ad can be received in a background mode, such that the user is unaware of the receipt/downloading of an ad. Once received and stored, the ad can be retrieved and displayed on the predefined event. This would prevent ads from intruding during conversations or other such operations and ensure that the user is present to view the ad. Other predefined events can include, ending a communication (e.g., call or data), pressing a key on the client device (e.g., "END" key), exiting an application on the client device, starting/activating the client device (e.g., powering up, unlocking, coming out of a standby mode, and the like), and opening the client device (e.g., opening a flip phone, slider phone, PDA, and the like.).

Those skilled in the art will appreciate that the foregoing options can be combined in whole or in part with each other. Additionally, in any of the above-discussed options, user response to the ad can be limited to a small number of choices connected to softkeys. For example, there could be two options (e.g., "Later" or "Check it out" or other similar options) presented for each ad displayed for the user to select. For example, "Check it out" can take the user to a purchasing page or other informational page. However, if the user selects the "Later" softkey or a similar "End/Off/Clear" or similar hardkey, the ad can be pushed to the CAM inbox and cached for possible later perusal.

Additionally, the user can be presented with a "Go to Ad Manager" or similar option that allows for easier access to the CAM inbox to view and/or delete cached ads and set preferences, such as opting-out of the system. If the automatic caching of ads is not desired a "Delete Ad" option can be presented to the user at the initial ad display. This option would allow for the user to immediately delete an ad rather than have it sent to the CAM inbox.

In one embodiment of the present invention, the Carrier Announcement Manager (CAM) is pre-installed on a client device, such as a wireless phone enabled with QUALCOMM's BREW (Binary Runtime Environment for Wireless). However, other APIs and devices can be used and the invention is not limited to a specific platform or device. Additionally, the CAM system can be optionally downloaded to the client device as part of a purchased bundle. Also, the end-user can voluntarily download the CAM system. This can be accomplished by sending an OTA message (e.g., SMS) to the client device containing the URL of the download location. Further flyers or direct mailings can be used to distribute downloading information. Once the CAM is installed, the device can receive and present ads and marketing information to the end-user as described in the foregoing.

Although the invention is not limited to a specific device, knowing the type device that the CAM is installed on can aid in the effective presentation of the ads. For example, the device specific features such as the screen size, input devices, memory, resident APIs and versions, and the like, dictate how much information can be displayed and how rich the content of the information can be.

Figure 4A:
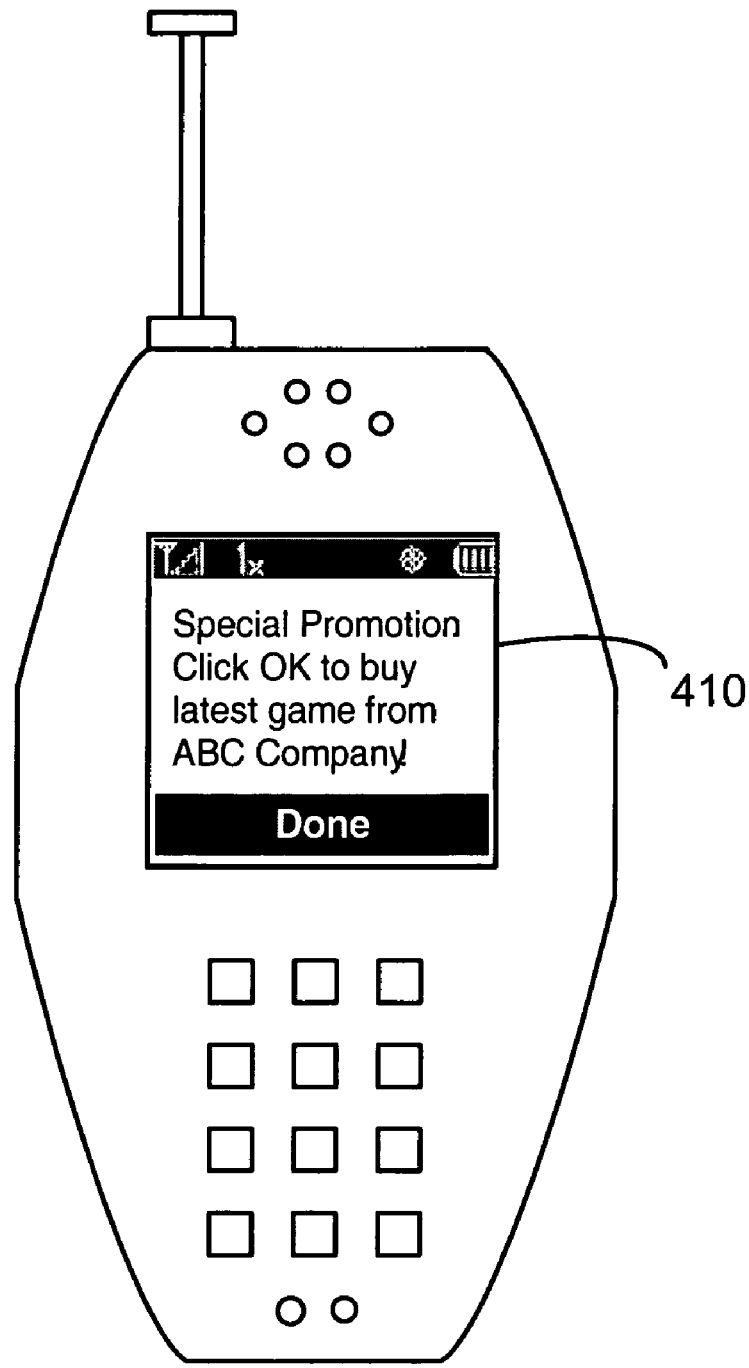
FIGS. 4A and 4B illustrate different announcement configurations for different client device display sizes in accordance with at least one embodiment of the invention.
Figure 4B:
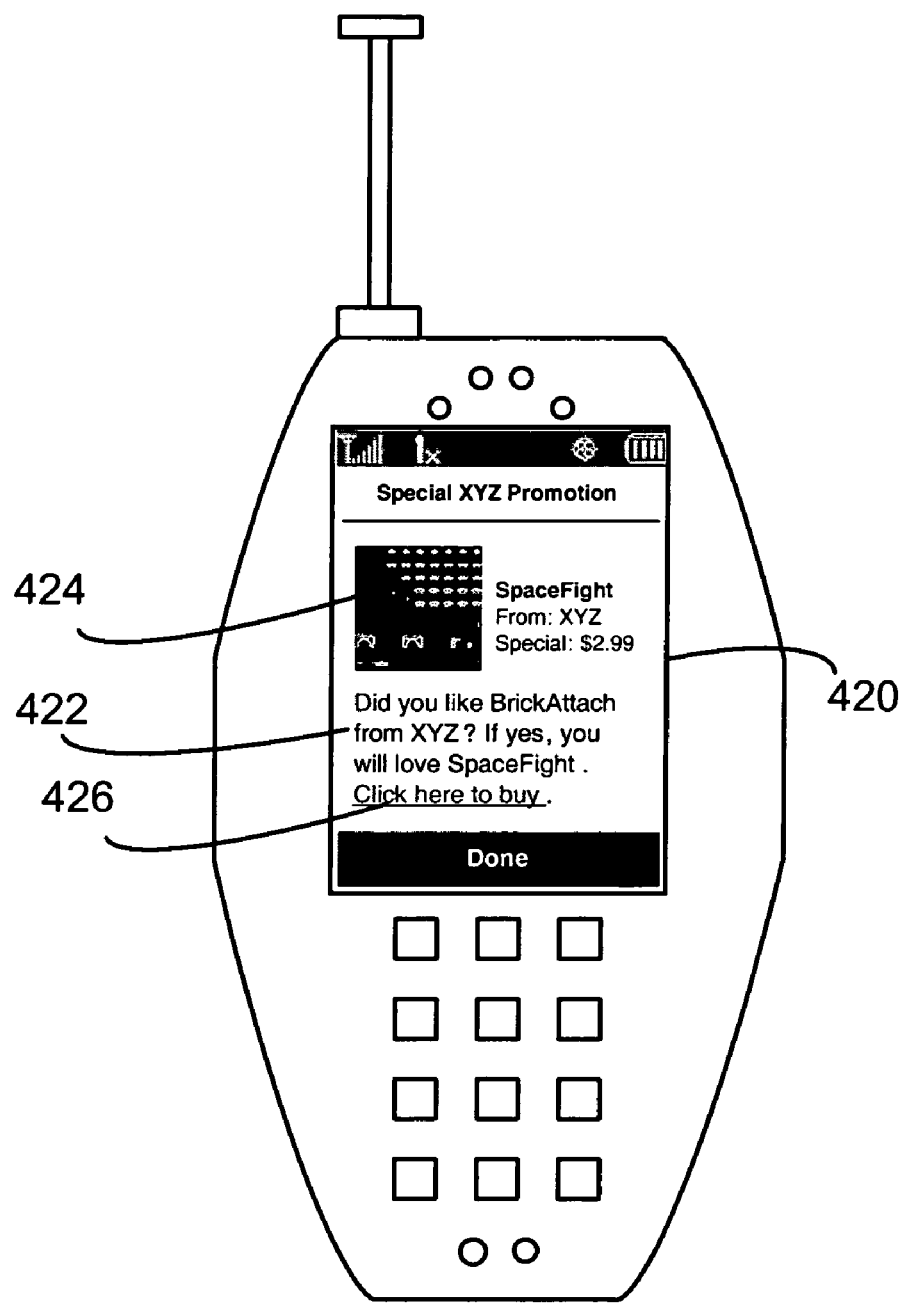

FIG. 4A illustrates an example of an ad on a small screen client device. Small screen ads 410 can be primarily text based and contain less information than large screen ads. FIG. 4B illustrates an example of an ad on a large screen device. The large screen ad 420 can contain both text 422 and an image 424, thus increasing the ad's appeal to the end-user. Additionally, the larger ad can also contain other features, such as a link 426 to an online store, further facilitating the ease of use for the end-user. Larger screen devices can allow for much richer ads, optionally containing screenshots for applications or other marketing related graphics. Based on the particular application, the minimum device screen size, for example, can be chosen as the basis for determining the type of message sent. Once again, these various ads can be stored on the ad dispatch server or other server and determined based upon the particular capabilities of each client device. Thus, a sender (e.g., a vendor) would not need to know the specifics of the client devices that the ads are being sent to.

To send the ad to the client device, the CAM can rely on any of a number of push mechanisms that enable the device to receive messages. In one exemplary embodiment of the present invention, a directed SMS can be used as the push mechanism. For example, a BREW-directed SMS can include the class ID of a BREW application and the data that the application will be able to retrieve when it receives the SMS. The data sent in the SMS can contain the text to be displayed on the ad page and the ID of the application, which will be used, for example, to bring the end-user to a page where purchases can be made.

In another exemplary embodiment of the invention, a network connection to a server can be used as the push mechanism. The CAM in this embodiment can connect to the server automatically on a periodic basis (e.g., every five minutes) or when manually activated to check if there is a new ad. This embodiment can allow the direct download of richer ads that can incorporate graphics, text, hyperlinks, multimedia and the like.

In another exemplary embodiment of the invention, a combination of both directed SMS and a network connection can be used as the push mechanism. The directed SMS tells the CAM application to wake up and connect to a server (e.g., ad dispatch server). The application can then connect to the server and retrieve the detailed ad data, such as text, pictures, video, audio and/or application ID.

Further, while most client platforms (e.g., all versions of BREW®) support directed SMS and network connectivity, advanced platforms (e.g., BREW® 2.0) can contain an HTML viewer API that aids in the display of ads in richer environments, such as those depicted in FIG. 4B. Using the advanced client platforms, the ad can be received in an HTML format including at least one of rich-formatted text, pictures, video, audio, hyperlinks (e.g., to online shops) and the like. Including hyperlinks to online shops can allow online purchases to be made directly from the ads.

Figure 5:
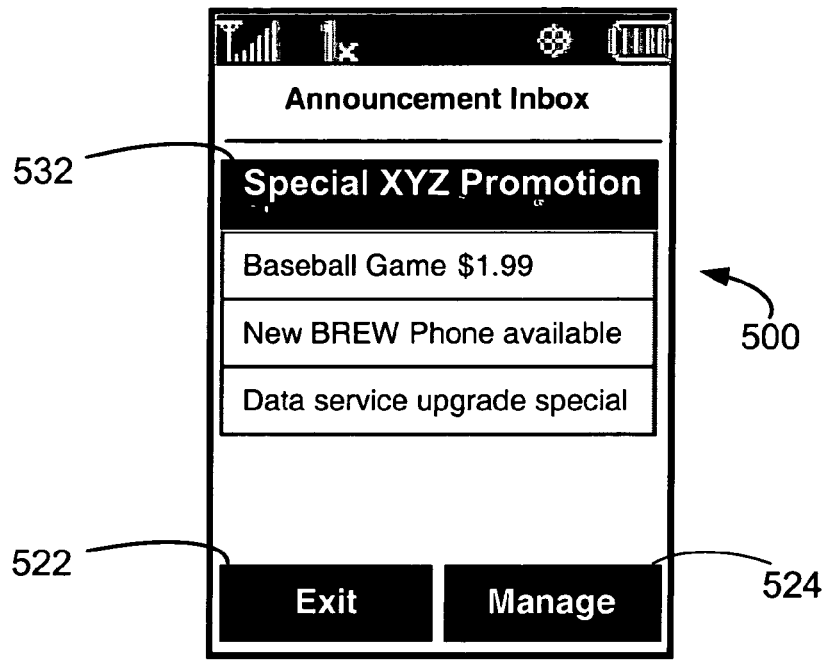
FIG. 5 illustrates an announcement inbox for managing stored announcements in accordance with at least one embodiment of the invention.

FIG. 5 is an exemplary illustration of the CAM inbox 500. The CAM can send an ad into an inbox, similar to an SMS inbox. FIG. 5 further illustrates an example of a menu of choices (e.g., 532) that can appear in the CAM inbox interface. The end-user can then click on one of the menu options to display the selected ad. For example, in FIG. 5, the end-user can click on "Special XYZ Promotion" 532 to see the ad relating to that menu item. Additionally, softkeys 522 and 524 are provided for exiting and access to management of the CAM inbox menu, respectively. However, the invention is not limited to the illustrated configuration and softkey functions. Other softkey functions, configurations and menu layouts can be created as will be appreciated by those skilled in the art.

Figure 6:
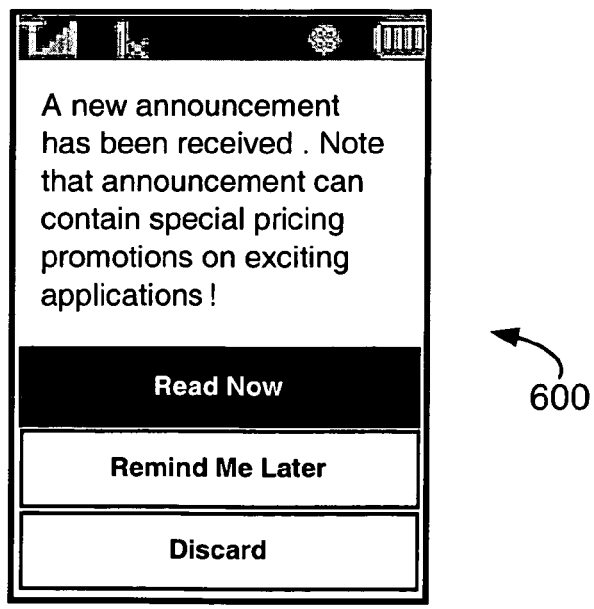
FIG. 6 illustrates a display notification and options in accordance with at least one embodiment of the invention.

In another embodiment, an optional reminder screen 600, such as illustrated in FIG. 6, can prompt the end-user to read the ad after it has been received and/or saved to the CAM inbox. For example, in FIG. 6, if the end-user activates the "Read Now" option, the ad is displayed to the user. If the user activates the "Remind Me Later", the ad is stored in or remains in the CAM inbox. The CAM then can set a future time to display the ad or reminder screen. If the user clicks on "Discard", the CAM deletes the ad.

In another exemplary embodiment of the invention, the foregoing features of the CAM system can be leveraged to provide time and location-based non-intrusive advertising and promotions. For example, the CAM system can be used to send low-priority location and/or time limited coupons and/or special promotions to end-users based upon location of the end-user and/or time of day. Accordingly, the location of the client device can be used to determine which client devices should receive the ad.

For example, a typical format to call an application on a BREW® enabled device is //BREW:<APP ID>:<Payload>. The App ID is a unique number that identifies the BREW® application. Payload is the data for the called application. Accordingly, at least one embodiment of the present invention can include a CAM specific call (App ID) and payload. For example, a system notification to users of a CAM enabled device of a discount at restaurant can include a format such as "//BREW:<CAM ID>:[X][Y][R][T][Popup Text][URL]", where "[" and "]" are separators, X and Y define center of a circle of interest, R is the radius of the circle of interest, T can be expiration time/date of the ad, Popup Text is the message shown to the user, (e.g. "XYZ Lunch Special all items 20% off") and URL is a URL (e.g., "http://www.XYZ.com/2004/12/09/lunch.html") to which the client device will connect to retrieve the additional information regarding the ad (e.g., current lunch menu). Those skilled in the art will appreciate that other configurations of the ad can be used and a variety of the different data types can be used to define the geographic area of interest. For example, the payload can contain, an ad ID so that delivery of the ad can be tracked, and additional coding to activate features of the CAM system discussed herein, such as a calling predefined HTML templates, audible signals, indicator lights, and the like. Further, the location information can be any type of information that defines a targeted area and is not limited to latitude and longitude coordinates.

Position location capabilities have been increasingly incorporated into wireless client devices and carrier networks, such as the E911 system. Additionally, the accuracy of the position location features has been increased with each new generation of device. A variety of systems are known for providing wireless position location information, such as network-based location information, client-based location information and hybrid location information. Network-based solutions rely on the signal transmitted from the client device and received at multiple fixed base stations, using Angle of Arrival (AOA) and Time of Arrival (TOA) to determine position. Client-based solutions make use of the Global Positioning System (GPS), a worldwide system of twenty-four satellites and their ground stations. By accurately measuring the distance from four or more satellites, the receiver can obtain its position anywhere on earth. Hybrid solutions, such as QUALCOMM's gpsOne® provide a combination of network-based and GPS solutions. For example, in rural and suburban areas, not many base stations can receive signals from the handset, but a GPS receiver can often receive data from four or more satellites. Conversely, in dense urban areas and inside buildings, GPS receivers may not detect enough satellites, but the wireless handset can contact two or more base stations.

Regardless of the technology used for determining the location of the wireless client device, the location information can be accessed, typically by APIs designed to access the location position data. Accordingly, an API-directed SMS announcement can initiate a location API (or other location application) in the client device to determine the client device location. Alternatively, the client device location can be determined from data previously stored at the server.

The sender can be a carrier/operator or trusted partner (e.g., application developer, merchant, and the like) with network access. The sender can determine the target audience based upon the location of the user and/or the time. For example, the sender can specify latitude and longitude and a radius for a desired/targeted audience. Accordingly, all active client devices that are within the location range specified by the sender can receive the ad. For example, all active clients within a two mile radius of a restaurant could receive a discount coupon ad that can be redeemed at the restaurant. As a further, refinement the discount coupon could be offered only a specific time window (e.g. during lunch time, 11:30 am to 1:30 pm). Alternatively, the active client devices can be identified by a specific landmark and/or immediate adjacent areas. For example, a particular shopping mall could be designated and all client devices in the shopping mall complex can receive the ad.

In at least one embodiment of the invention an ad can go directly to the CAM inbox and cause no disruption to the end-user's action. For example, a small and optionally blinking icon can be placed on the main screen client device to notify the end-user to open the CAM inbox. Also, if available on the client device, an external indicator light can be flashed instead of or in addition to the icon. Alternatively, more aggressive notification actions can also be initiated, such as scrolling messages, activating buzzers, and the like as described in the foregoing. Upon notification, the end-user can launch the CAM system and access the CAM inbox to view the ads. The end-user can also select an ad for display, as previously discussed. For example, the end-user can select coupons he is interested in and redeem them at a related store that sent the coupons. Further, the response to the ad at the CAM can be configured at the installation of the CAM, by the user and/or can be indicated as part of the payload of the message. For example, a priority field can be used in the payload to indicate the level of obtrusiveness of each ad.

Additionally, to further enhance the unobtrusiveness and functionality of the ads, the ads can be location and time sensitive after they have been received at the CAM inbox. For example, the ads can be automatically deleted from the CAM inbox when the client device is no longer within the desired location parameters (e.g., the end-user has left the mall or has left the general area of the restaurant). Further, the ad can also be automatically deleted based on temporal conditions. For example, the ad can be automatically deleted after a certain time (e.g., the coupon expires in 30 minutes) or at a predetermined date/time (e.g., close of business, end of week, and the like). The automatic deletion of non-relevant ads can greatly reduce the annoyance and maintenance of the CAM inbox.

Figure 7A:
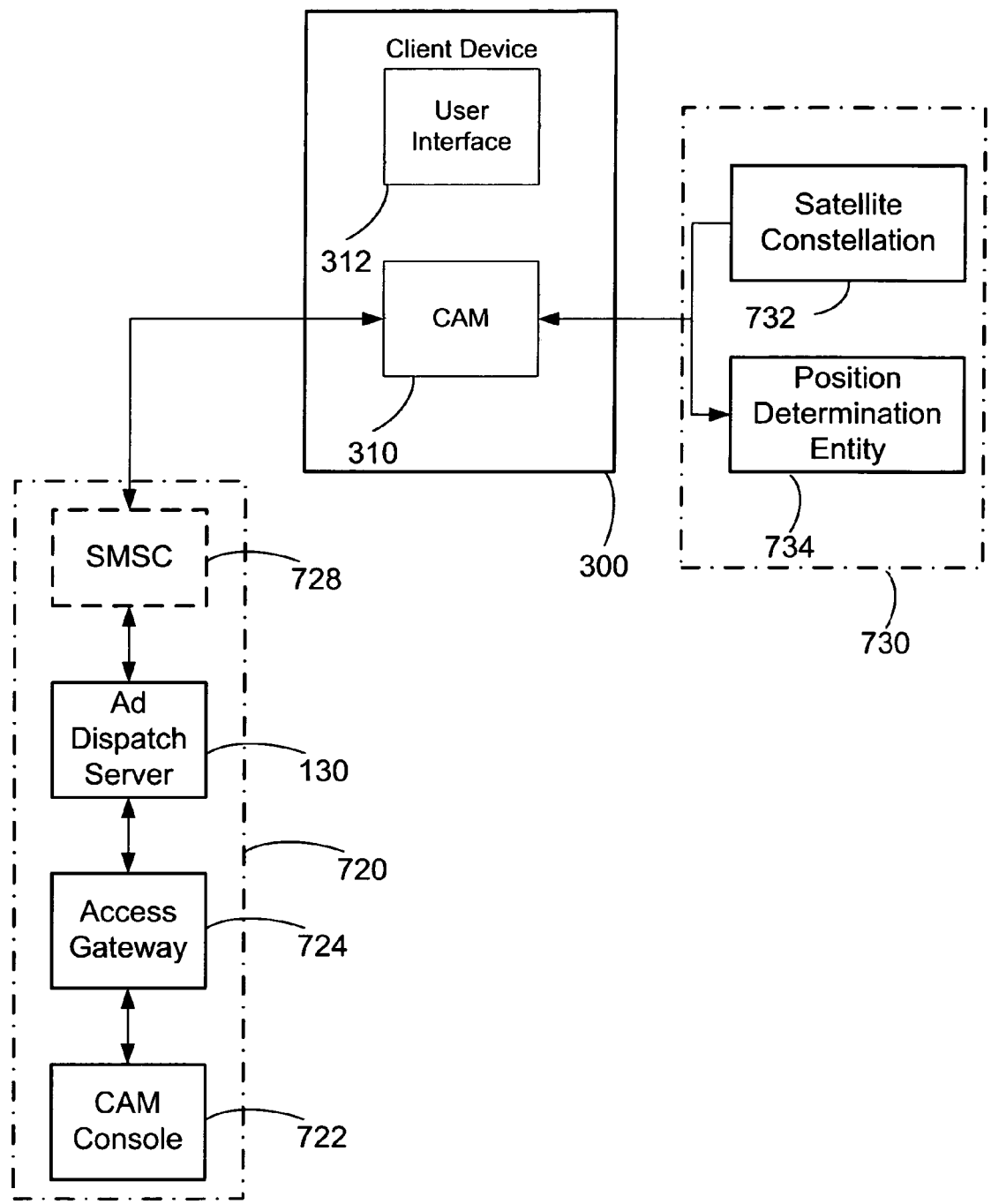
FIGS. 7A and 7B are system level diagrams illustrating the interaction of system components for sending and receiving location-based advertisements in accordance with embodiments of the invention.

FIG. 7A is a block diagram of a system that can be used by a sender to deliver the ads, according to at least one embodiment of the invention. A client device 300 can include a user interface 312 (e.g., keypad, buttons, speaker, indicator light, display, and the like) operably coupled to a CAM system 310, as previously discussed. An ad generation system 720 can include a CAM console 722 that allows a sender to access the system 720 and generate the ads including the location-based data (e.g., specific longitude, latitude and radius). The CAM console can be either at the carrier network or at a remote trusted sender (e.g., merchant, developer, government entity and the like). Optionally, an access gateway 724 can be coupled between the CAM console 722 and the ad dispatch server 130. The access gateway 724 can be configured to provide secure communications between the CAM console 722 and the ad dispatch server 130, using encryption and/or other techniques known in the art. Further, the CAM console can be coupled to the access gateway via the Internet, VPN, PSTN, wireless link, and the like.

Alternatively, if the CAM console 722 is located at the carrier network, the ad generation system 720 can be integrated into one computer-based system which can include the CAM console and ad dispatch server functionality. Further, a Short Message Service Center (SMSC) 728 can be part of the ad generation system 720 and can be used to send directed-SMS messages to the client device 300. However, other OTA data transmitting techniques can be used and SMSC 728 is not required in all embodiments of the invention.

Figure 7B:
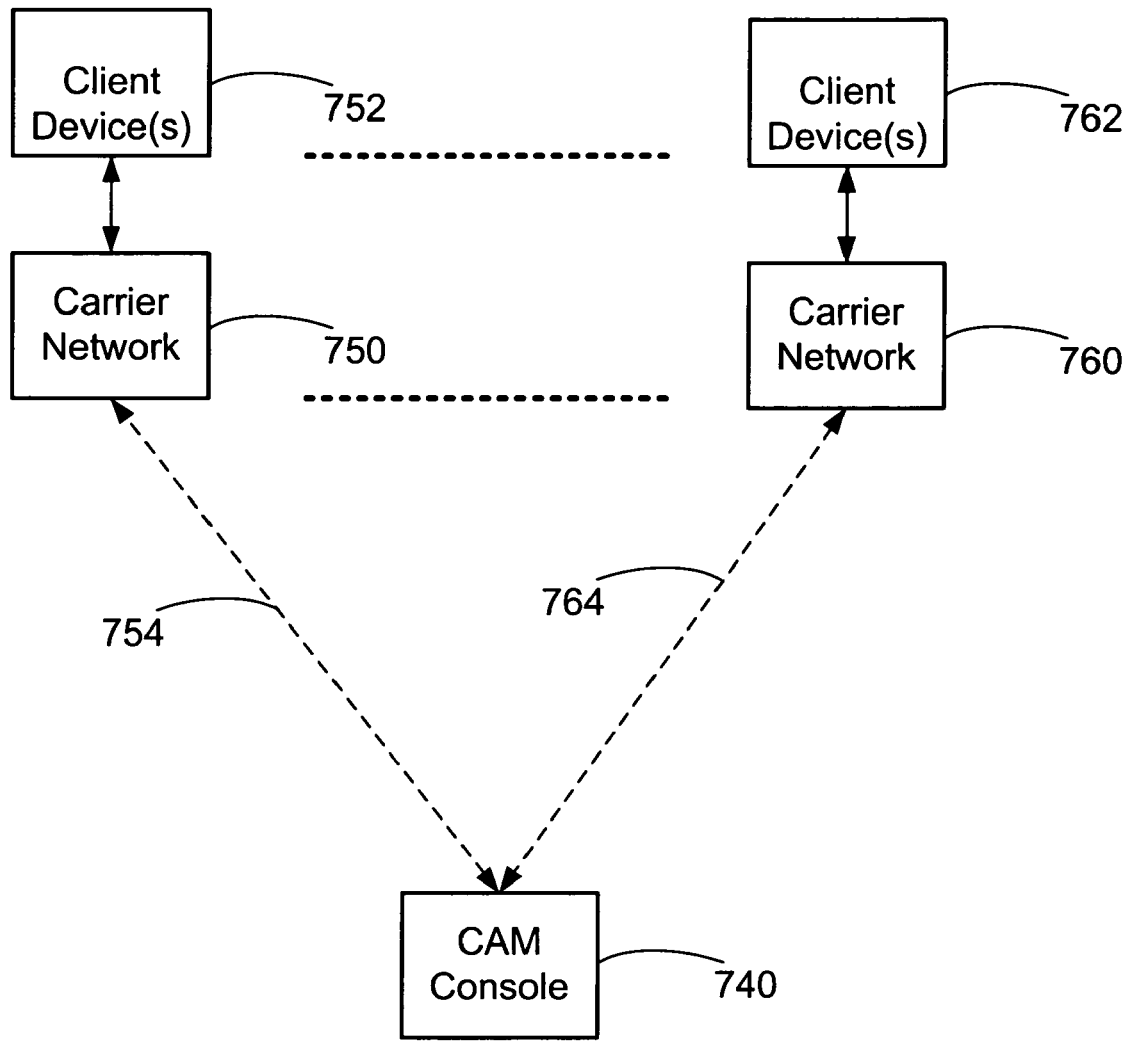

Referring to FIG. 7B, an alternative embodiment of the invention is illustrated in which a remote CAM console 740 is operably coupled to at least one additional ad dispatch server. Further, as illustrated each ad dispatch server (not illustrated) is coupled to or contained within a different carrier networks 750, 760. The configuration of FIG. 7B, allows for one common CAM console to access different carrier networks 750, 760 and ultimately the different client devices 752, 762 in communication with each network. This feature can allow a central CAM console 740 to access multiple client devices (e.g., 752, 762) residing on multiple carrier networks (e.g., 750, 760) which simplifies the dissemination of the ad to multiple carriers and can increase the delivery to the desired client devices. For example, client devices 752 in communication with a first carrier 750 and client devices 762 in communication with a second carrier 760 may be within the targeted geographic area. Accordingly, generating a targeted ad at CAM console 740 and sending it to the first carrier network 750 and the second carrier network 760 can greatly increase the number of client devices that receive the ad. The carrier networks 750, 760 can be connected to CAM console 740 by a secure links 754, 764, to limit the potential for unauthorized access to the ad dispatch servers and client devices. Accordingly, links 754, 764 can be connections via the Internet, virtual private network (VPN), public switched telephone network (PSTN), and/or a wireless link using secure transmission capabilities as is known in the art. Likewise, those skilled in the art will appreciate that more than one CAM console can be connected to a carrier network/ad dispatch server.

The client device location can be determined, for example, based on data contained at the client device, data contained at the carrier and/or location data communicated to the carrier or other remote server. For example, in FIG. 7A, an external location system 730 can be accessed by the client device 300. Specifically, CAM 310 can acquire position data from visible GPS satellites 732, once received the position data can be relayed to a position determination entity (PDE), e.g., a server in the carrier network. The PDE 734 can then analyze the position data and determine the location of the client device 300. The location (e.g., longitude, latitude, and optionally altitude coordinates) of the client device 300 can then be stored at a remote server and/or communicated to the client device 300, for storage and/or use by CAM 310. For example, CAM 310 can use the longitude and latitude coordinates to determine if the client device 300 is within the designated geographic area defined by the location data in the ad.

Alternatively, the device location can be determined at the client device 300 and external servers do not need to know the specific location of the client device, which may provide more privacy for the end-user. For example, the location of the client device 300 can be determined from visible GPS satellites 732 solely at the client device, using known techniques. In this embodiment, there is no need to transmit location data or related information to a remote server for further processing. Accordingly, the location information associated with the ad can be used by the client device to determine whether the client device is within the targeted geographic area defined by the location information transmitted in the ad. If the client device determines that it is not within the targeted area, the ad can be discarded, without interrupting the end-user.

Alternatively, in another embodiment of the invention, an ad contains location information that can be used to define a geographic area. Client devices within the targeted area (i.e., the defined geographic area) can be identified from the location information stored on a server in the carrier network. For example, a CAM enabled client device can periodically report the location of the client device or execute an application to provide location data to a remote server that can calculate the location of the client device. The stored location information can be a table, for example, containing longitude and latitude coordinates for each client device. When an ad is generated containing location information to define a geographic area of interest (e.g., longitude and latitude coordinates of four points defining a rectangular area), a server can use the stored client location information to identify the client devices in the targeted area. Then the ad can be sent to the client devices that are identified. Although the ad location information does not have to be transmitted to the client device in this embodiment, the location information can still be used by the CAM system on the client device for inbox maintenance (e.g., to delete messages when the client device is out of the targeted area) as discussed above. Alternatively, if the client device location is monitored at a remote server, then the ad generation system can generate another message that directs the CAM system on the client device to delete the previously sent ad when the client device location is outside the targeted area. Additionally, a message that directs the CAM system on the client device to delete a specific previously sent ad can be event-based, such as deleting a promotional ad once all available promotional items are sold. Accordingly, this aspect can be used regardless of whether the client device location data is maintained locally or remotely.

The process of identifying the client device location can include many variations and sub-processes. For example, the device location can be determined by accessing client device location information. Then, the client device location can be used to determine if the client device is within a geographic area defined by the location data in the ad. The location information can be stored locally at the client device and/or remotely (e.g., at a server on the carrier network). Likewise, the determination as to whether the client device is within the geographic area can be determined at either the client device or a remote server. The client device location information can include longitude and latitude coordinates of the client device. Likewise, the location data in the ad can include center longitude and center latitude coordinates and a radial distance. The geographic area can then be determined as longitude and latitude coordinates that are within the radial distance from the center longitude and the center latitude coordinates. Alternatively, the location data in the ad can include at least three longitude and latitude coordinates, which define an area (e.g., triangle, square, and rectangle). The geographic area can then be determined as longitude and latitude coordinates that are within the area defined by the at least three longitude and latitude coordinates.

Further, depending on the accuracy desired, base stations and/or communication towers can be used to determine the targeted client devices. In this embodiment, the location data generated in the ad can be used to define a geographic area as discussed above. Then, client devices communicating with base stations/communication towers within the defined geographic area can be considered to be within the targeted geographic area and would be sent the ads. However, this aspect can be used in combination with the previously discussed methods for delivering location-based ads.

For example, instead of transmitting the ads directly, a "wake-up" message can be sent to the client devices that invoke the CAM system on each client device, which reports the location of the client device. The updated location information can be used by the server to then target only those devices that are actually within the targeted geographic area. Alternatively, client devices communicating with the identified base stations/communication towers can be sent the ad and the CAM system on the client device can use the local geographic location data or obtain a geographic location. Using its geographic location and the geographic area defined in the ad, the client device can determine if it is within the targeted area, as discussed above. Using the base station/communication tower as a first level of granularity to identify a client device can further reduce the network traffic and focus the ads to client devices that are most likely within the targeted geographic area.

Figure 8A:
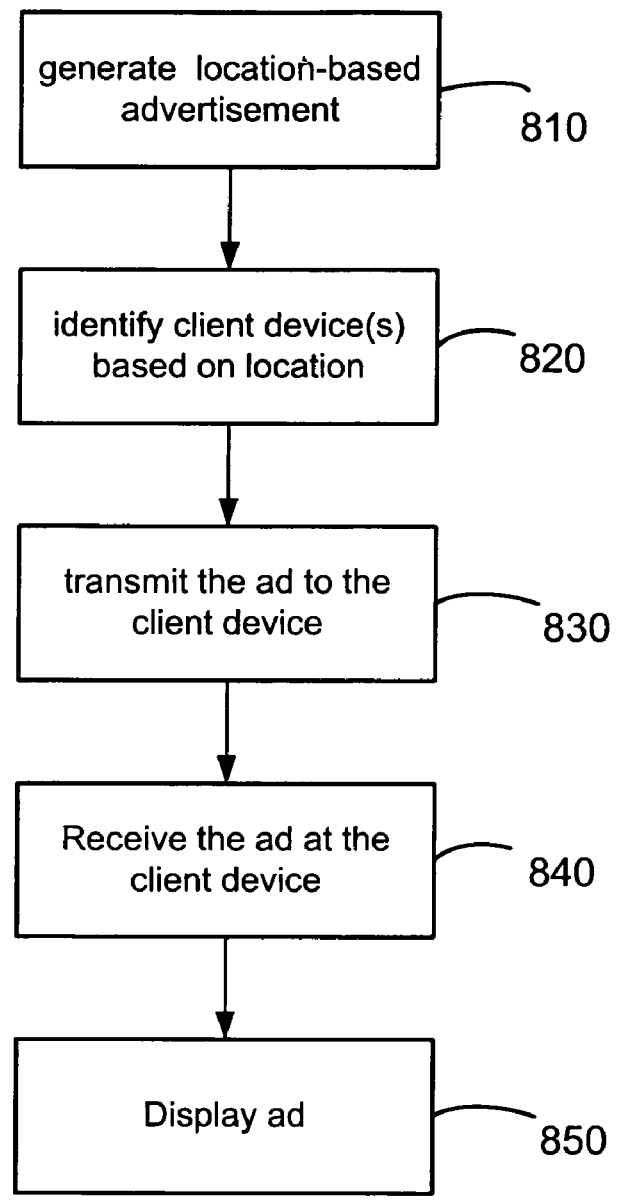
FIGS. 8A-8C are block diagrams illustrating methods in accordance with embodiments of the invention.

In view of the foregoing disclosure, those skilled in the art will recognize that embodiments of the invention include methods of performing the sequence of actions, operations and/or functions previously discussed. For example, as illustrated in FIG. 8A, a method for wirelessly communicating ads can include generating an ad containing location data, at block 810. A client device to receive the ad is identified based on the location data in the ad and the location of the client device, in block 820. Further, the ad can be transmitted to the client device, in block 830. The ad can be received at the client device, block 840, and the ad can be displayed on the client device, block 850. Those skilled in the art will appreciate that the flowchart illustrated is not limited to sequential execution and block elements may be reordered as desired. For example, block 820 can be inserted between block 840 and block 850 to represent the relevant operations when the client device determines whether or not it is within the geographic area defined in the ad.

Figure 8B:
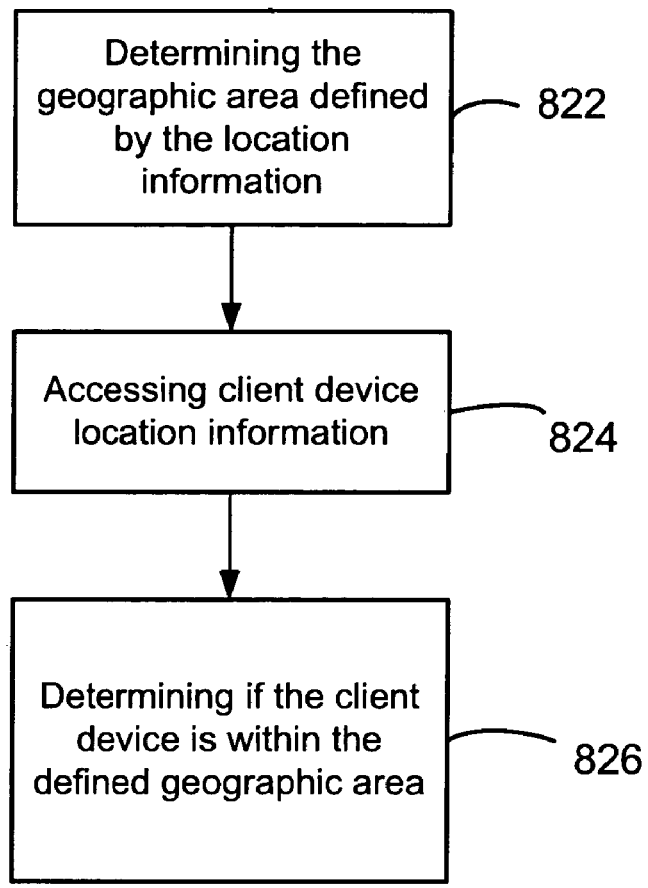

FIG. 8B is a flowchart illustrating a method for identifying client devices based on the geographic area defined by the location data in the ad. In block 822, the targeted geographic area is determined using the location data contained in the ad. As discussed above, this determination can be performed at the client device, a server on the carrier network, and/or other remote server. The client device location information is accessed, in block 824. Once again this can be performed at the client device, a server on the carrier network, and/or other remote server, as previously discussed. Further, accessing the data can include any of the methods discussed herein (e.g., accessing previously stored geographic position data in the client device or on a server remote to the client device, initiating a location API resident on the client device to obtain the location of the client device (e.g., using gpsOne®), and the like). Then, in block 826, the geographic position of the client device can be compared with the targeted area to determine if the client device is within the targeted area. Likewise, this determination can be performed at the client device, a server on the carrier network, and/or other remote server, as previously discussed.

Figure 8C:
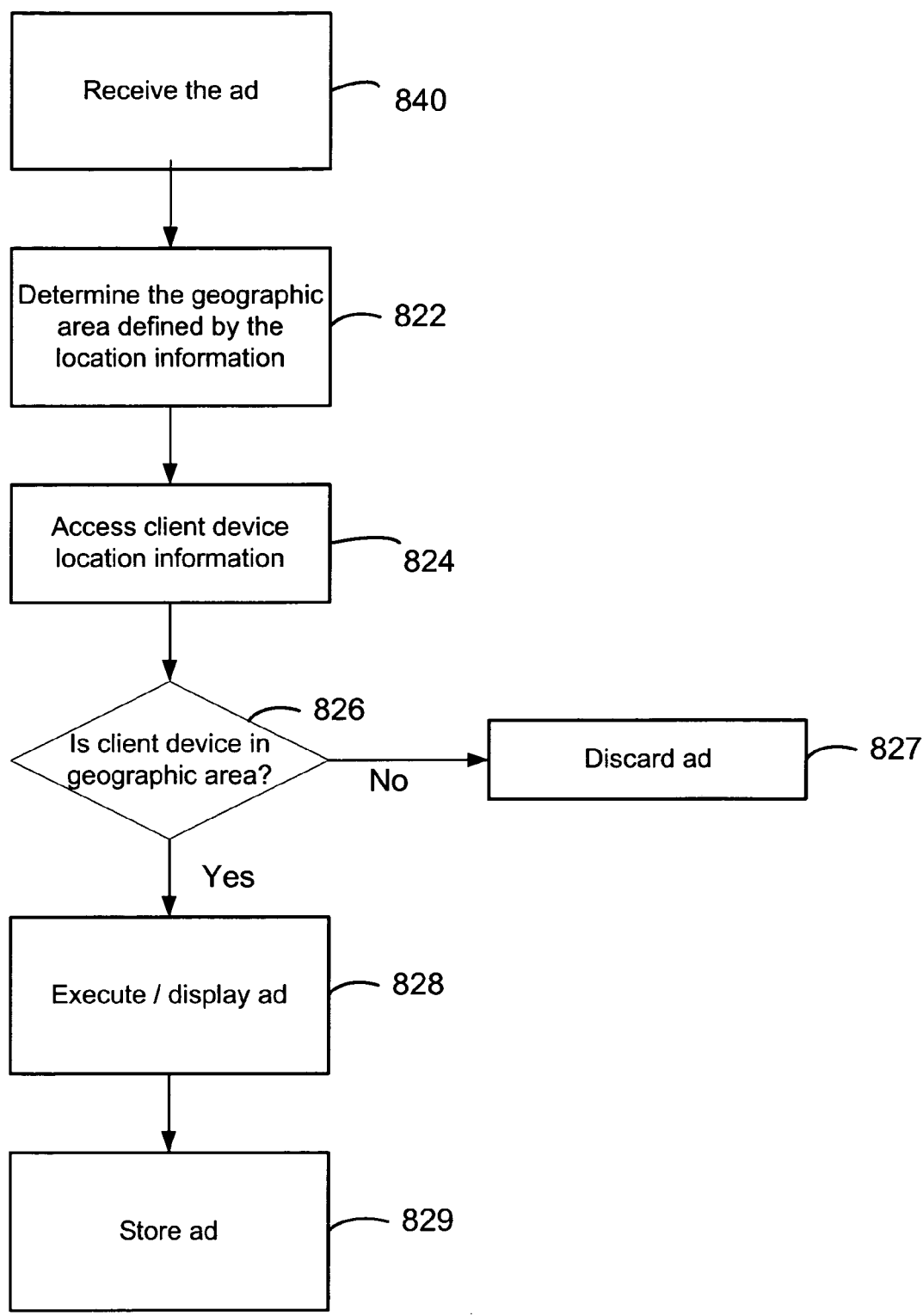

For example, FIG. 8C illustrates an embodiment of the invention where the client device determines if it is in the targeted geographic area. In this configuration, as discussed above, the sequence of actions are different than illustrated in FIG. 8A, in that the ad is received at the client device (e.g., 840) before the client device is identified (e.g., 820) as being in the targeted geographic area. Alternatively, the client device can be identified at a first level, such as by base station/communication tower, city, region, or other generally broad geographic zones, in block 820. Then, the process illustrated in FIG. 8C, can be a further refinement performed at the client level after the ad has been received.

In describing FIG. 8C, like functions will retain the same reference number. Accordingly, blocks 822, 824 and 826 operate as discussed above; however, at the client device. If the client device receives an ad, but it is not in the targeted geographic area, the ad is discarded, block 827. If the client device is in the targeted geographic area than the ad is displayed or the associated instruction is executed (e.g., start browser and download specified page), block 828. The term display can include any type of notification, such as text and/or graphic display on a display unit, indicator lights, audible signal (e.g., buzzer, ringer, voice message, and the like), vibration, and combinations of the foregoing. The message can be stored for recall at a later time, in block 829. Once stored the ad can be recalled automatically on a periodic basis, or at a user's request. Further, the ad can be stored in a designated inbox for management by the user and/or automatic inbox management by the CAM, as previously discussed.

Figure 9:
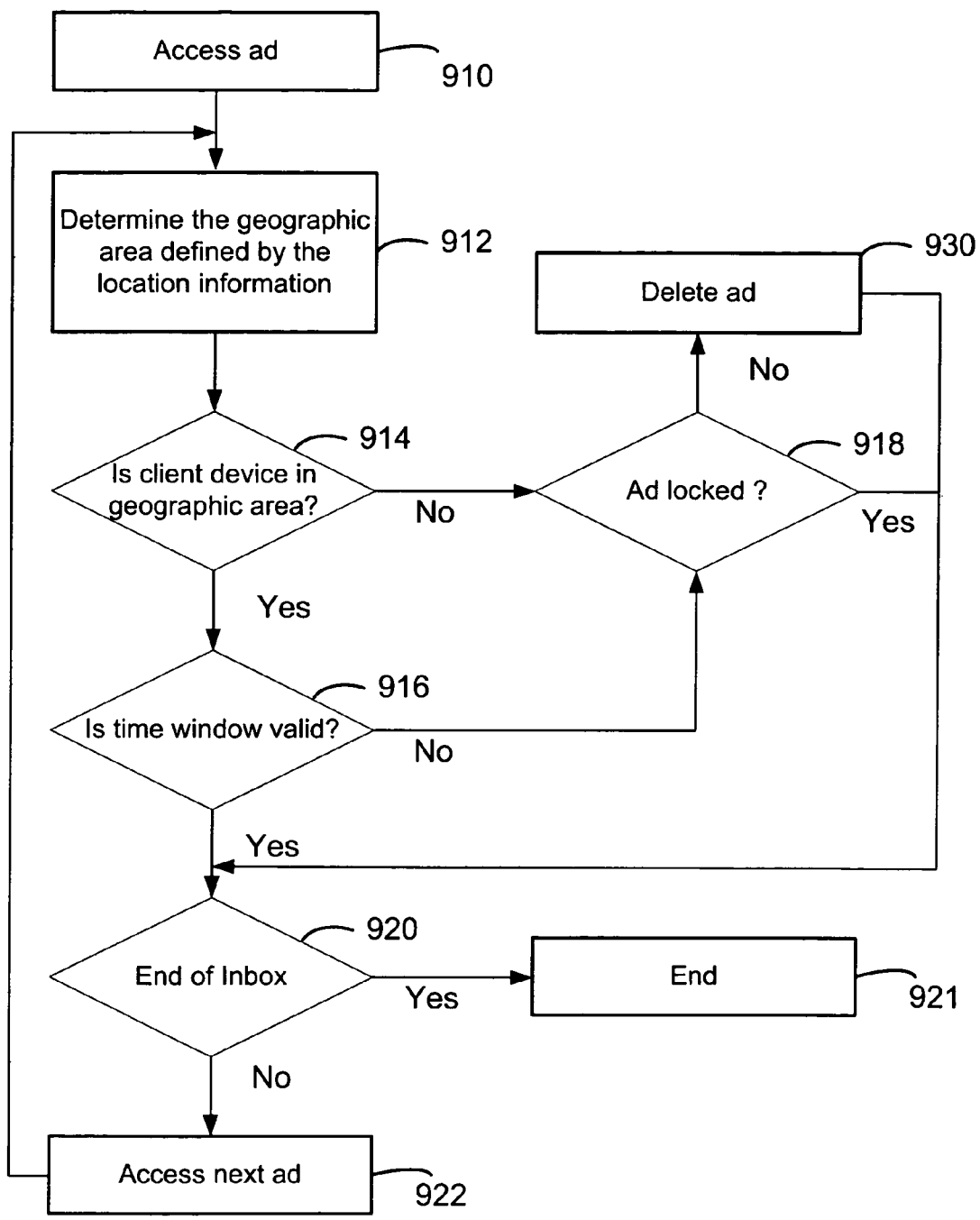
FIG. 9 is a block diagram illustrating an automatic inbox management method in accordance with at least one embodiment of the invention.

Once stored in the CAM inbox the ad can be managed as discussed in the foregoing by the CAM system. FIG. 9 illustrates an exemplary process for automatically managing the CAM inbox. For example, a first ad or selected ad in the inbox can be accessed, in block 910. If the ad is a location based ad the system can determine the targeted geographic area, as discussed above, in block 912. The current location of the client device can be obtained and compared to the targeted area, in block 914. If the device is in the targeted area, then any relevant time information contained in the ad can be checked, in block 916. For example, an expiration time/date, an elapsed time, and the like can be included in the ad, as discussed in the foregoing description. If the time window defined in the ad is still valid, then a check is made to see if all messages have been examined, in block 920. If not the next ad is selected, in block 922, and the process is repeated. If the end of the inbox is reached, then the automatic management process is ended, in block 921.

If either of the spatial or temporal checks in blocks 914 and 916 result in a negative determination (i.e., the client device is outside the targeted area, or the ad has expired), then a check is made to see if the ad is locked, in block 918. If the ad is locked by the user and/or by the system (e.g., set by a priority code or separate lock code in the payload of the ad), then the process reverts back to block 920. If the ad is not locked, then the ad is deleted in block 930 and the process continues to block 920, to check for additional ads in the inbox. Accordingly, the CAM system can automatically manage the CAM inbox on a periodic basis, when the memory used reaches a predetermined threshold, and/or when the user manually accesses the CAM inbox to ensure that relevant ads/information are stored in the CAM inbox. This feature can reduce interruptions of the user or other client device activities, due to managing the ads received and stored on the client device. However, the user can still manually access and manage the CAM inbox to view, delete, and lock the ads as discussed herein.

In further embodiments, those skilled in the art will appreciate that the foregoing methods can be implemented by the execution of a program embodied on a computer readable medium, such as the memory of a computer platform. The instructions can reside in various types of signal-bearing or data storage primary, secondary, or tertiary media. The media may comprise, for example, RAM accessible by, or residing within, the client device and/or server. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A wireless advertisement delivery system, comprising:
a server configured to generate and transmit an advertisement containing location data that defines a geographic area; and
a client device including a carrier announcement manager (CAM), wherein the CAM is configured to receive the advertisement, wherein the advertisement is directed to the client device based on a location of the client device and the geographic area defined in the advertisement, and wherein the CAM is configured to store the advertisement in an inbox on the client device upon receipt by the client device and to convert an oldest Hypertext Markup Language (HTML) advertisement in the inbox to an advertisement containing a uniform resource locator (URL) referring to a server-side location of an HTML document, when storing a new advertisement would exceed a memory usage of the inbox.

2. The system of claim 1, wherein the client device is at least one of a wireless computing device, a wireless telephone, a cellular telephone, a personal digital assistant (PDA), or a paging device.

3. The system of claim 1, wherein the client device location is determined using at least one of network-based location information, client-based location information or hybrid location information.

4. The system of claim 1, wherein the advertisement is at least one of a text-based advertisement or a graphic-based advertisement.

5. The system of claim 1, further comprising:
logic configured to determine whether the client device is located within the geographic area defined in the advertisement.

6. The system of claim 5, wherein the logic is located in at least one of the client device, an advertisement generation system, a remote server operably coupled to a carrier network, or a server in a carrier network in communication with the client device.

7. The system of claim 1, wherein the advertisement is automatically deleted from the inbox based upon at least one of a current location of the client device, a number of advertisements in the inbox, a memory usage of the inbox, a specified time or an event-based trigger.

8. The system of claim 7, wherein the inbox is a CAM inbox that is separate from a Short Message Service (SMS) inbox.

9. The system of claim 1, wherein the server comprises at least one of a CAM console, an advertisement dispatch server, or a Short Message Service Center (SMSC).

10. The system of claim 9, wherein the CAM console is remotely located from the advertisement dispatch server.

11. The system of claim 10, wherein an access gateway is coupled between the CAM console and the advertisement dispatch server and wherein the access gateway is configured to provide secure communications between the CAM console and the advertisement dispatch server.

12. The system of claim 11, wherein the access gateway is coupled to the CAM console by at least one of the Internet, a virtual private network (VPN), a local area network, a wide area network, a public switched telephone network (PSTN), or a wireless link.

13. The system of claim 12, wherein the CAM console is operably coupled to at least one additional advertisement dispatch server.

14. The system of claim 1, wherein the CAM is configured to report advertisement response data.

15. The system of claim 14, wherein the advertisement response data is at least one of purchase data, advertisement display time, advertisement display date, advertisement viewing data, or advertisement type.

16. The system of claim 15, wherein the server comprises logic to receive and process the advertisement response data.

17. The system of claim 1, wherein the CAM is configured to request a document in response to a URL contained in the advertisement, and wherein the server is configured to transmit the document selected based on the URL and characteristics of the client device.

18. The system of claim 17, wherein the characteristics of the client device include at least one of a type of client device, memory capacity, display resolution, display color capability, operating system, software installed, or input/output devices.

19. The method of claim 1, further comprising:
automatically deleting the stored advertisement based upon at least one of the location of the client device, a current time, a number of advertisements store, or an event-based advertisement delete request.

20. The method of claim 19, further comprising:
preventing the deletion of the advertisement at an initial display of the advertisement.

21. A method for wirelessly communicating advertisements comprising:
generating an advertisement containing location data;
identifying a client device to receive the advertisement based on the location data in the advertisement and a location of the client device;
transmitting the advertisement to the client device;
receiving the advertisement at the client device;
storing the advertisement on the client device in an inbox if the client device is within a targeted geographic area defined by the location data and
converting an oldest HTML advertisement in the inbox to an advertisement containing a uniform resource locator (URL) referring to a server-side location of an HTML document, when storing a new advertisement would exceed a memory usage of the inbox.

22. The method of claim 21, wherein the advertisement includes a Short Message Service (SMS) message containing code configured to initiate an application resident on the client device.

23. The method of claim 21, wherein identifying the client device comprises:
accessing client device location information; and
determining if the client device is within a geographic area defined by the location data in the advertisement.

24. The method of claim 23, wherein the client device location information comprises longitude and latitude coordinates, and wherein the location data in the advertisement comprises longitude and latitude coordinates defining the geographic area.

25. The method of claim 23, wherein the client device location information is stored remotely from the client device and wherein the determination if the client device is within the geographic area is performed by a remote server.

26. The method of claim 21, wherein identifying the client device comprises:
initiating a location application on the client device; and
determining the location of the client device using at least one of network-based location information, client-based location information or hybrid location information.

27. The method of claim 26, wherein the client device determines a geographic area defined by the location data in the advertisement and determines if the client device is within the geographic area.

28. The method of claim 21, wherein identifying the client device further comprises:
identifying at least one base station capable of communication with devices within a targeted geographic area defined by the location data in the advertisement; and
identifying the client device in communication with the at least one base station.

29. The method of claim 21, further comprising:
requesting an HTML document in response to a URL contained in the advertisement; and
transmitting the HTML document based on the URL and characteristics of the client device.

30. The method of claim 29, wherein the characteristics of the client device include at least one of a type of client device, memory capacity, display resolution, display color capability, operating system, software installed, or input/output devices.

31. The method of claim 21, further comprising:
reporting advertisement response data from the client device.

32. The method of claim 31, wherein the advertisement response data is at least one of purchase data, advertisement display time, advertisement display date, advertisement viewing data, or advertisement type.

33. A wireless client device, comprising:
a user interface; and a carrier announcement manager (CAM) configured to receive an advertisement containing location data that defines a targeted area, configured to store the advertisement on the client device in an inbox, if the client device is within the targeted area, and configured to convert an oldest HTML advertisement in the inbox to an advertisement containing a uniform resource locator (URL) referring to a server-side location of an HTML document, when storing a new advertisement would exceed a memory usage of the inbox.

34. The client device of claim 33, wherein the client device is at least one of a wireless computing device, a wireless telephone, a cellular telephone, a personal digital assistant (PDAs), or a paging device.

35. The client device of claim 33, wherein the CAM is further configured to automatically delete the advertisement from the inbox based on at least one of a current location of the client device, a number of advertisements in the inbox, a memory usage of the inbox, a specified time or an event-based trigger.

36. The client device of claim 33, wherein the CAM is further configured to retrieve and display the stored advertisement based on a predefined event.

37. The client device of claim 36, wherein the predefined event is at least one of ending a communication, pressing a key on the client device, exiting an application on the client device, activating the client device or opening the client device.

38. The client device of claim 33, wherein the CAM is further configured to determine a geographic location of the client device.

39. The client device of claim 38, wherein the geographic location is determined using at least one of network-based location information, client-based location information or hybrid location information.

40. The client device of claim 38, wherein the CAM is further configured to determine if the client device is within the targeted area.

41. The client device of claim 40, wherein the CAM is further configured to discard the advertisement if the client device is not within the targeted area.

42. The client device of claim 33, wherein the CAM is further configured to receive and store the advertisement in a background mode.

43. A method for wirelessly receiving an advertisement at a client device comprising:
  receiving an advertisement containing location data;
  determining a geographic location of the client device;
  determining if the client device is within a geographic area defined by the location data contained in the advertisement based on the geographic location of the client device;
  storing the advertisement in an inbox on the client device if the client device is within the geographic area; and
  converting an oldest HTML advertisement in the inbox to an advertisement containing a uniform resource locator (URL) referring to a server-side location of an HTML document, when storing a new advertisement would exceed a memory usage of the inbox.

44. The method of claim 43, wherein determining the geographic location of the client device further comprises:
  communicating data with a remote server to determine the geographic location of the client device.

45. The method of claim 43, further comprising:
  transmitting the geographic location of the client device to a remote server on at least one of a periodic basis, an initiation of the client device or an initiation of the CAM.

46. The method of claim 43, further comprising:
  automatically deleting the advertisement from the inbox based on at least one of a current location of the client device, a number of advertisements in the inbox, a memory usage of the inbox, a specified time or an event-based trigger.

47. The method of claim 43, wherein the advertisement is presented on a display after a predefined event has occurred.

48. The method of claim 47, wherein the predefined event includes at least one of ending a communication, pressing a key on the client device, exiting an application on the client device, activating the client device or opening the client device.

49. A non-transitory computer-readable storage medium on which is stored a computer program for wirelessly communicating location-based advertisements, the computer program comprising instructions which, when executed by at least one computing device, cause the computing device to perform the process of:
  generating an advertisement containing location data;
  identifying a client device to receive the advertisement based on the location data in the advertisement and a geographic location of the client device;
  transmitting the advertisement to the client device;
  receiving the advertisement at the client device;
  storing the advertisement on the client device in an inbox if the client device is within a targeted geographic area defined by the location data; and
  converting an oldest HTML advertisement in the inbox to an advertisement containing a uniform resource locator (URL) referring to a server-side location of an HTML document, when storing a new advertisement would exceed a memory usage of the inbox.

50. The computer-readable storage medium of claim 49, wherein the process of identifying the client device comprises:
  accessing client device location information; and
  determining if the client device is within a geographic area defined by the location data in the advertisement.

51. A non-transitory computer-readable storage medium on which is stored a computer program for wirelessly communicating location-based advertisements, the computer program comprising instructions which, when executed by at least one computing device, cause the computing device to perform the process of:
  receiving an advertisement containing location data at a client device;
  determining a geographic location of the client device;
  determining if the client device is within a geographic area defined by the location data contained in the advertisement based on the geographic location of the client device;
  storing the advertisement in an inbox on the client device if the client device is within the geographic area and
  converting an oldest HTML advertisement in the inbox to an advertisement containing a uniform resource locator (URL) referring to a server-side location of an HTML document, when storing a new advertisement would exceed a memory usage of the inbox.

52. The computer-readable storage medium of claim 51, wherein the computer program instructions, when executed by at least one computing device, further cause the computing device to perform the process of:
  discarding the advertisement if the client device is not within the geographic area; and
  automatically deleting the advertisement from the inbox based on at least one of a current location of the client device, a number of advertisements in the inbox, a memory usage of the inbox, a specified time or an event-based trigger.

53. The computer-readable storage medium of claim 52, wherein the computer program instructions, when executed by at least one computing device, further cause the computing device to perform the process of:
reporting advertisement response data, wherein the advertisement response data is at least one of purchase data, advertisement display time, advertisement display date, advertisement viewing data, or advertisement type.

54. A system for wirelessly communicating advertisements comprising:
means for generating an advertisement containing location data that defines a geographic area;
means for identifying a client device to receive the advertisement based on the geographic area and a geographic location of the client device;
means for transmitting the advertisement to the client device;
means for receiving the advertisement at the client device;
means for storing the advertisement on the client device in an inbox if the client device is within a targeted geographic area defined by the location data; and
means for converting an oldest HTML advertisement in the inbox to an advertisement containing a uniform resource locator (URL) referring to a server-side location of an HTML document, when storing a new advertisement would exceed a memory usage of the inbox.

55. The system of claim 54, wherein the advertisement is at least one of a Short Message Service (SMS) message, an HTML document or an Announcement Download Request (ADR) containing a URL.

56. The system of claim 54, further comprising:
means for storing at least one HTML document related to an ADR; and
means for accessing the at least one stored HTML document based on characteristics of the client device requesting the document.

57. The system of claim 54, further comprising:
means for storing a plurality of HTML documents related to the advertisement based on characteristics of a plurality of client devices; and
means for selecting one of the plurality of HTML documents based on characteristics of the client device.

58. The system of claim 57, wherein the characteristics of the client device include at least one of a type of client device, memory capacity, display resolution, display color capability, operating system, software installed, or input/output devices.

59. A client device for wirelessly receiving advertisements comprising:
means for receiving an advertisement containing location data that defines a geographic area;
means for storing the advertisement on the client device in an inbox, if a geographic position of the client device is within the geographic area; and
means for converting an oldest HTML advertisement in the inbox to an advertisement containing a uniform resource locator (URL) referring to a server-side location of an HTML document, when storing a new advertisement would exceed a memory usage of the inbox.

60. The client device of claim 59, further comprising:
means for accessing client device location information; and
means for determining if the client device is within the geographic area defined by the location data in the advertisement.

61. The client device of claim 60, further comprising:
means for automatically deleting the stored advertisement based upon at least one of a current location of the client device, a current time, or an event-based advertisement delete request.

62. The client device of claim 59, further comprising:
means for presenting the advertisement on a display after a predefined event has occurred.

63. The client device of claim 62, wherein the predefined event includes at least one of ending a communication, pressing a key on the client device, exiting an application on the client device, activating the client device or opening the client device.

64. The client device of claim 59, further comprising:
means for displaying the advertisement as advertisement wallpaper on a main screen.

65. The client device of claim 64, wherein the advertisement wallpaper is displayed on the main screen after an initial display of the advertisement.

66. The client device of claim 65, wherein the advertisement wallpaper is removed from the main screen based on at least one of a user request or an elapsed display time.

* * * * *